(12) United States Patent
Barish

(10) Patent No.: US 6,496,259 B2
(45) Date of Patent: *Dec. 17, 2002

(54) OPTICAL DEVICE PROVIDING RELATIVE ALIGNMENT

(76) Inventor: Robert John Barish, 211 E. 70th St., Apt. 12G, New York, NY (US) 10021

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/473,067

(22) Filed: Dec. 28, 1999

(65) Prior Publication Data

US 2001/0043328 A1 Nov. 22, 2001

(51) Int. Cl.[7] .............................. G01B 11/00; G01C 1/00
(52) U.S. Cl. ........................ 356/399; 356/138; 356/139; 356/145; 356/401
(58) Field of Search ........................... 356/3, 138, 139, 356/143, 144, 145, 148, 399, 401; 359/436, 439, 838, 871, 872, 437, 438, 440, 441, 442; 33/276, 278, 286, 403, 404, 418, 430

(56) References Cited

U.S. PATENT DOCUMENTS

| | | | |
|---|---|---|---|
| 3,772,795 A | * | 11/1973 | Calvet ........................... 356/3 |
| 3,982,839 A | | 9/1976 | Schwartz |
| 4,480,390 A | | 11/1984 | Frissora et al. |
| 4,730,926 A | * | 3/1988 | Wedemeyer ................. 356/138 |
| 5,174,576 A | * | 12/1992 | Lee et al. ..................... 359/838 |

* cited by examiner

Primary Examiner—Frank G. Font
Assistant Examiner—Roy M. Punnoose
(74) Attorney, Agent, or Firm—Pennie & Edmonds, LLP

(57) ABSTRACT

The present invention is directed to an optical apparatus that provides for relatively aligning a first object with respect to a second reference object. In one embodiment, the apparatus includes a generally rectangular substrate member with a reflective surface. At least one indicia is disposed in the reflective surface. The indicia can be one of the edges or can be lines that are ruled or etched in the reflective surface. In use, one of the edges can be positioned against some feature of the object to be aligned, often an edge of this object. The optical apparatus is then adjusted and/or the user moves his head so that a relevant portion of a second object is visualized. The optical apparatus and the first object are moved together until the image of the reference object is aligned appropriately with the edge. In another embodiment, the optical apparatus has a plurality of lines ruled, etched or positioned on the reflective surface. These lines can also be used to relatively align with the second object.

23 Claims, 1 Drawing Sheet

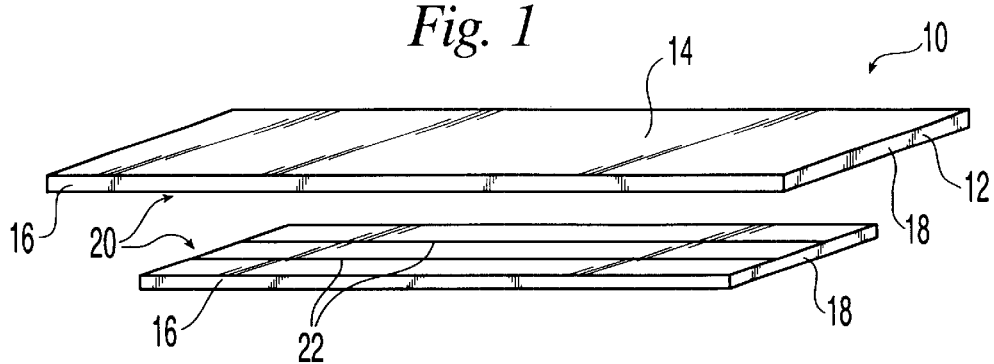
Fig. 1
Fig. 2
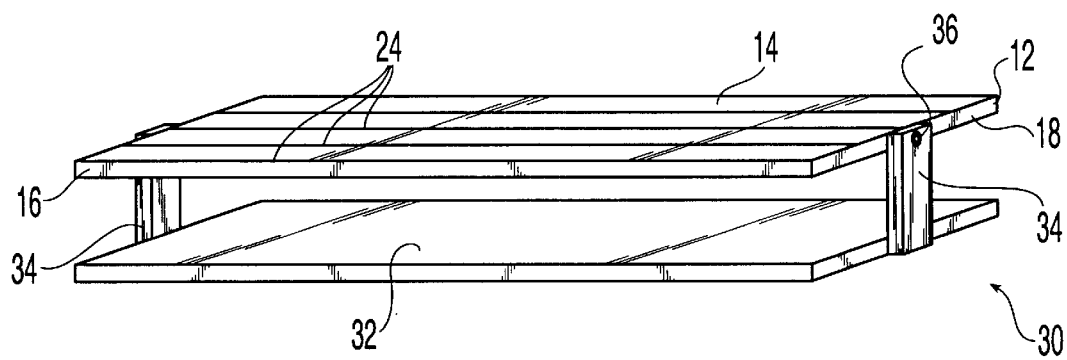
Fig. 3
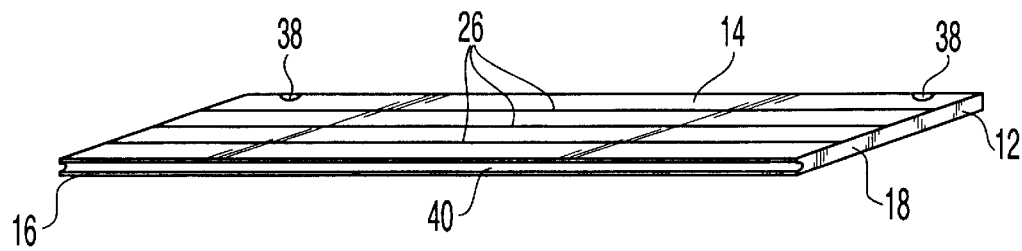
Fig. 4

OPTICAL DEVICE PROVIDING RELATIVE ALIGNMENT

FIELD OF THE INVENTION

The present invention is directed to an optical device and more particularly to a device that can be freely applied to an object to relatively align that object with respect to another object.

BACKGROUND ART

There are known devices that can be used to level an object with respect to the horizontal or vertical plane. Such devices include bubble levelers which consist of a glass or plastic ampule containing a fluid that does not completely fill the volume of the ampule. As a result there is a bubble of air that moves within the ampule to provide an indication of the level of the surface of the object. However such devices are generally used to provide a vertical or horizontal leveling.

Other known alignment devices are shown for example in U.S. Pat. Nos. 3,982,839; 4,480,390; and 4,730,926. U.S. Pat. No. 3,982,839 describes a device which is pulled into a vertical orientation by the action of gravity. This patent describes an apparatus that casts a laterally reflected reference light beam. In U.S. Pat. No. 4,480,390 a reflected image is used in aligning an object with respect to the top-dead center of a wheel. This patent describes a mirror-holding assembly that is aligned on a cylindrical object. The assembly employs a built-in level to position it at the top of the cylindrical object. U.S. Pat. No. 4,730,926 describes a system of triangulation wherein a mark on a mirror is lined up with a reference point on a vehicle body thus aiding in mirror adjustment.

However, none of the above-mentioned devices provides an optical apparatus that can be freely employed for relatively aligning any first object with respect to a second or reference object in any location.

SUMMARY OF THE INVENTION

The present invention is directed to an optical apparatus providing relative alignment of a first object with respect to a second object, comprising substrate member having a surface and at least one edge adapted for being disposed adjacent a corresponding edge portion of the first object; reflective medium disposed on at least a portion of the surface of the substrate; and indicia supported by the reflective medium. The indicia in one preferred embodiment comprises at least one line segment disposed in the reflective medium. The indicia can comprise a plurality of lines which need not be generally parallel. However, preferably they are generally parallel and evenly spaced apart. Moreover, they can be of equal length which is equal to the length of the substrate. The optical apparatus can further comprise at least one marking notch.

In another preferred embodiment, the optical apparatus further comprises a base member and at least one mounting post, the substrate member being pivotally supported on the mounting post.

In an alternative embodiment, the optical apparatus comprises a transparent template adapted for being coupled to the substrate member and having at least one line segment disposed supported by the template. Preferably the transparent template is movably coupled to the substrate member.

The present invention is also directed to an optical apparatus providing relative alignment of a first object with respect to a second object, comprising, substrate member having a surface and at least one edge adapted for being disposed against a corresponding edge portion of the first object; reflective medium disposed on at least a portion of the surface of the substrate; and at least one indicia disposed in the reflective medium.

Furthermore, the present invention is directed to a method of relatively aligning a first object with respect to a second object comprising providing an optical apparatus comprising substrate member having a surface and at least one edge adapted for being disposed adjacent a corresponding edge portion of the first object; reflective medium disposed on at least a portion of the surface of the substrate; and indicia supported by the reflective medium; disposing the at least one edge against an edge of the first object; and adjusting the optical apparatus such that at least a portion of an edge of the second object is lined up with the at least one edge.

BRIEF DESCRIPTION OF THE DRAWINGS

The present invention is described in detail below with reference to the drawings wherein:

FIG. 1 is a perspective view of an optical apparatus according to the present invention.

FIG. 2 is a perspective view of an alternative embodiment of an optical apparatus according to the present invention.

FIG. 3 is a perspective view of yet another alternative embodiment of an optical apparatus according to the present invention.

FIG. 4 is a perspective view of still another alternative embodiment of an optical apparatus according to the present invention.

DETAILED DESCRIPTION OF THE PREFERRED EMBODIMENTS

In the description which follows, any reference to direction or orientation is intended primarily and solely for purposes of illustration and is not intended in any way as a limitation to the scope of the present invention. Also, the particular embodiments described herein, although being preferred, are not to be considered as limiting of the present invention.

Referring to FIG. 1, there is shown a planar mirror 10 whose length is greater than its width. The planar mirror 10 is formed of a substrate 12 and an upper surface 14 which is mirrored. The mirror 10 has longitudinal edges 16 and width edges 18, which can serve as indicia supported by the substrate 12. The planar mirror 10 can be positioned against or held parallel to the edge of an object to be aligned relative to a reference object so that the reference object can be seen in the planar mirror. By moving both the object and planar mirror together, the object can be moved into a desired position and/or orientation as determined by the image of the reference object seen in the planar mirror 10.

By way of illustration, a person may desire to position a framed picture so that it does not appear tilted on a wall. The planar mirror 10 can be positioned so that its width edge 18 or length edge 16 is against the vertical or horizontal edge of the picture frame. In one alternative embodiment, the length edge 16 and width edge 18 can be equal. Preferably, the length edge 16 will be considerably longer than the width edge 18. The planar mirror 10 can then be adjusted so a vertical (such as the intersection of two walls) or horizontal line (such as the intersection of the wall with either the ceiling or the floor) of the room is lined up with an edge of the planar mirror 10. For example, if the length edge 16 of the mirror 10 is placed along the horizontal edge of the picture frame, then one of the length edges 16 of the mirror 10 can be lined up with the intersection of the wall with the ceiling or the intersection of the wall with floor. Alternatively, the reference object may be another picture frame or object in which case an edge of that reference picture frame or object is lined up with an edge or line in mirror 10.

In an alternative embodiment illustrated in FIG. 2, the mirror 10 can include as indicia 20 not only the length and width edges but also lines 22, two of which are shown in FIG. 2. Although the lines 22 are shown in FIG. 2 preferably as being parallel, they do not have to be parallel. Alternatively they can be intersecting at a predetermined angle of intersection or at a right angle. While lines 22 are preferably generally parallel to the length edge 16 and are the same length as length edge 16 of mirror 10, they can be shorter. Alternatively, the lines 22 can be generally parallel to the width edges 18. In yet other embodiments, the indicia can be dashed lines, curved lines or other configurations that correspond to the lines, curvatures or configurations of the reference object. This allows for a wide range of orienting or aligning an object relative to a reference object.

As shown in FIGS. 3 and 4, the indicia 20 includes the length and width edges and also a plurality of lines 24 and 26, respectively, which preferably are equally spaced apart and parallel to each other. However, other configurations as described above and herein are also available. For example, as in the embodiments of FIGS. 1 and 2, the lines 24 and 26 need not be parallel but can be intersecting and need not extend the full length of edges 16 and 18.

In one embodiment, the lines 22,24, and 26 can be ruled, etched, decaled or otherwise formed on the mirrored surface 14 of mirror 10. Alternatively, the lines can be formed by other methods known to those skilled in the art. For example, the lines can be supported by a transparent template such as that used with slide rules. Such template can be movably coupled to the substrate 12 so that it can slide, for example, along the length or width of the substrate. By using decals of lines or other indicia, various configurations of the reference object can be accommodated without the need for remanufacturing the substrate. As previously described, the lines can also be ruled, etched or otherwise formed on the mirrored surface 14.

The length and width of mirror 10 can vary as desired. Preferably, the mirror 10 can be large enough to fit in one's palm. If less user head motion is desired in operation, then the width can be made larger. This is also the case, by use of the lines 22,24, and 26, namely less user head motion may be required. Thus in the case of the mirror 10 of FIG. 2, the edges 16 and 18 as well as the two lines 22 can serve as guides to line up any of those edges or lines with a line on a reference object such as an intersection line on a wall, ceiling or floor. In this version, less user head motion would generally be required when lining up one of the several lines with the reference object than would be required to line up any edge of a narrow mirror. In this case, the number of reference lines available for the alignment process increases from the two edges of the mirror of FIG.1 to a greater value which is the sum of the number of guide lines plus the two edges. In addition, having a visible image on both sides of the chosen guide line would be very helpful in judging alignment, whereas using only a narrow mirror's two edges limits the field of view to a significantly greater extent.

Referring to FIG.3, the mirror 10 could also be made into an assembly 28 in which it would be mounted with a pivot mechanism 30 on to a base 32. In one embodiment, the pivot mechanism 30 includes two mounting posts 34 extending as shown in FIG. 3 from the base 32. The mirror 10 has posts 36 that are supported in corresponding grooves or cutouts on posts 34. By holding the base against the object to be aligned and pivoting the mirror 10, the field of view available in the direction of the reference object could be better selected, while at the same time minimizing the head motion required of the user. This would be desirable, for example, when working on a ladder where the mirror 10 could be tilted to allow easy visualization of the intersection of the wall with the ceiling just above the object's position. Thus, the user would not have to significantly move his head to get this view.

As shown in FIG. 4, the mirror 10 could have notches 38 or other positional features such that, once it is aligned, marks can be made to allow the device to be put aside while nails, screws, or other attachment hardware would be positioned using the marks that have been made. The distance between these notches and/or the length of the mirror itself, could be made to conform in various ways with the distance between the "studs" used to support sheet rock or other wall material. For example, the mirror device could have these notches spaced about 16 inches apart. The mirror 10 could also be entirely mounted on a "studfinder", so that it could be placed directly over a wall stud prior to its use in establishing the positioning marks. For a tilting mirror on a base, the base could have the marking notches.

In addition to simply holding or placing the mirror 10 against the object to be aligned, it could be attached in various ways including the use of magnets, suction cups including the type where a lever creates the vacuum as is done for portable kitchen or shop accessories, clips which can include those that are spring driven, and clamps including those that are hand tightened. Alternatively, one edge 16 of the mirror 10 can have a groove 40, as shown in FIG. 4, to allow positioning on the object to be aligned. The planar mirror 10 can be used wherever desired including in the construction trades, where it is desired to build structures that are "true" in horizontal or vertical orientation. In such instance, a representative sample can be built in a central location. Then the construction workers can be equipped with the optical devices 10. Each worker can then use his device 10 to sight on the example area and build or lay out his component of the project appropriately aligned to that example. Similarly, this approach would also work by using as a reference object the available alignment elements of an adjacent structure or building, such as floor slabs, that had previously been constructed. Such approach also applies to interior work. A picture or cabinet could be aligned by reference to brickwork, roofing, or window framing on an adjacent structure seen through a window.

While the present invention has been described and illustrated herein with respect to the preferred embodiments thereof, it should be apparent that various modifications, adaptations and variations may be made utilizing the teachings of the present disclosure without departing from the scope of the present invention.

I claim:

1. Optical apparatus for relatively aligning a first object with respect to a second object, the first object having at least one generally straight edge portion and the second object also having at least one generally straight edge portion, comprising:

a. hand portable integral substrate member having a surface and at least one generally straight edge portion for being freely disposed adjacent a corresponding generally straight edge portion of the first object;

b. reflective medium disposed on at least a portion of the surface of the substrate; and c. indicia supported by said reflective medium, said hand portable substrate member and indicia providing relative alignment of a first object with respect to a second object so that the generally straight edge portion of the first object can be aligned with the generally straight edge portion of the second object, in any location.

2. The optical apparatus of claim 1 wherein said indicia comprises at least one line segment disposed in said reflective medium.

3. The optical apparatus of claim 2 wherein said indicia comprises a plurality of lines.

4. The optical apparatus of claim 3 wherein at least two of said lines are not generally parallel.

5. The optical apparatus of claim 3 wherein said lines are generally parallel and evenly spaced apart.

6. The optical apparatus of claim 3 wherein said lines are of equal length which is equal to the length of the substrate.

7. The optical apparatus of claim 1 further comprising at least one marking notch.

8. The optical apparatus of claim 1 further comprising a base member and at least one mounting post, said substrate member being pivotally supported on said mounting post.

9. The optical apparatus of claim 1 further comprising a transparent template adapted for being coupled to the substrate member and having at least one line segment supported by said template.

10. The optical apparatus of claim 9 wherein said indicia comprises a plurality of lines which are generally parallel and equally spaced apart.

11. The optical apparatus of claim 9 wherein said transparent template is movably coupled to the substrate member.

12. Optical apparatus for relatively aligning a first object with respect to a second object, the first object having at least one generally straight edge portion and the second object also having at least one generally straight edge portion, comprising:

a. hand portable integral substrate member having a surface and at least one generally straight edge portion for being freely disposed against a corresponding generally straight edge portion of the first object;

b. reflective medium disposed on at least a portion of the surface of the substrate; and c. at least one indicia disposed in said reflective medium, said hand portable substrate member and indicia providing relative alignment of a first object with respect to a second object so that the generally straight edge portion of the first object can be aligned with the generally straight edge portion of the second object, in any location.

13. The optical apparatus of claim 12 wherein said indicia comprises at least one line segment disposed in said reflective medium.

14. The optical apparatus of claim 13 wherein said indicia comprises a plurality of lines.

15. The optical apparatus of claim 14 wherein at least two of said lines are not generally parallel.

16. The optical apparatus of claim 14 wherein said lines are generally parallel and evenly spaced apart.

17. The optical apparatus of claim 14 wherein said lines are of equal length which is equal to the length of the apparatus.

18. The optical apparatus of claim 12 further comprising at least one marking notch.

19. The optical apparatus of claim 12 further comprising a base member and at least one mounting post, said substrate member being pivotally supported on said mounting post.

20. The optical apparatus of claim 12 further comprising a transparent template adapted for being coupled to the substrate member and having at least one line segment disposed in by said template.

21. The optical apparatus of claim 20 wherein said indicia comprises a plurality of lines which are generally parallel and equally spaced apart.

22. The optical apparatus of claim 20 wherein said transparent template is movably coupled to the substrate member.

23. Method of relatively aligning a first object with respect to a second object using a hand portable substrate member and indicia providing relative alignment of the first object with respect to the second object in any location, the first object having at least one generally straight edge portion and the second object also having at least one generally straight edge portion, the method comprising:

a. providing an optical apparatus comprising:
 i. hand portable integral substrate member having a surface and at least one generally straight edge portion for being freely disposed adjacent a corresponding generally straight edge portion of the first object;
 ii. reflective medium disposed on at least a portion of the surface of the substrate; and
 iii. indicia supported by said reflective medium said hand portable substrate member and indicia providing relative alignment of a first object with respect to a second object, in any location, b. disposing said at least one edge against an edge of the first object; and c. adjusting said optical apparatus such that at least a portion of an edge of the second object is lined up with said at least one edge of the first object.

* * * * *